June 20, 1950 T. L. DALTON 2,511,971
COMBINATION OF A VEHICLE AND REARVIEW MIRROR
SIGNAL AND EXTREMITY MARKER DEVICE THEREFOR
Filed Nov. 15, 1948 2 Sheets-Sheet 1
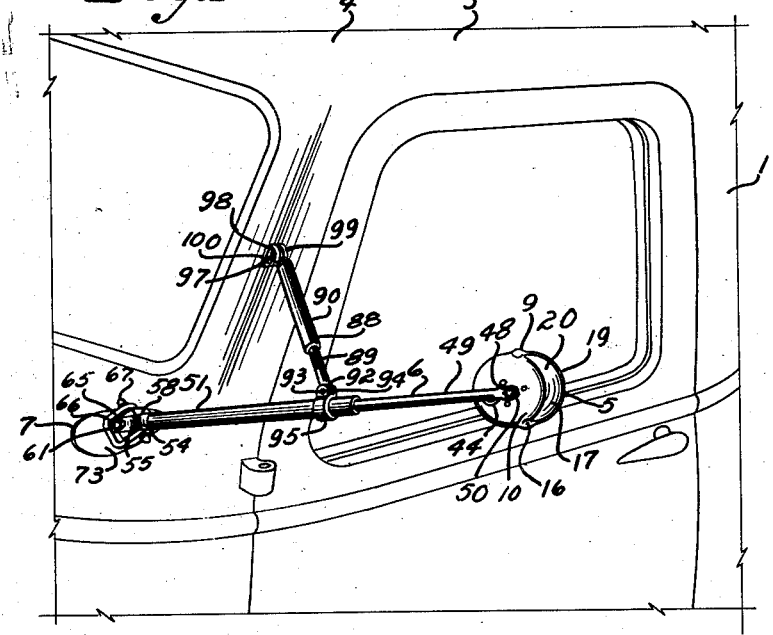
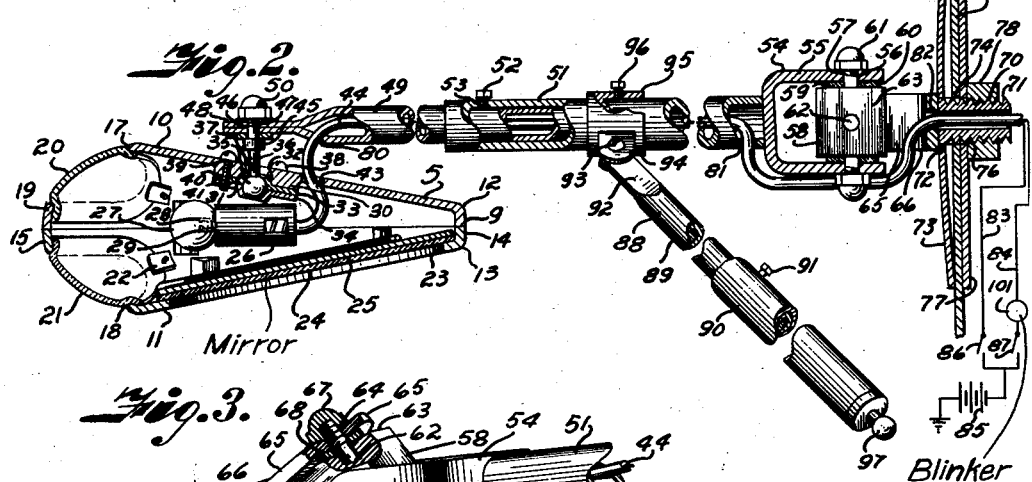
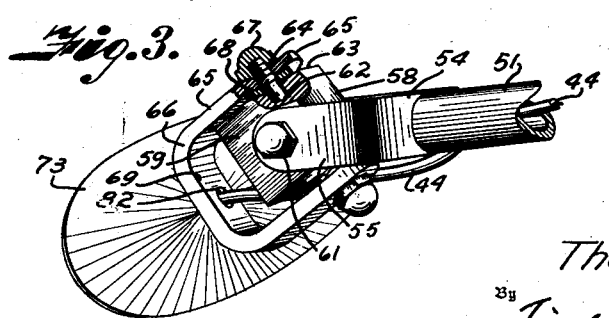
Inventor
Thomas L. Dalton
By Fishburn & Mullendore,
Attorneys June 20, 1950           T. L. DALTON           2,511,971
COMBINATION OF A VEHICLE AND REARVIEW MIRROR
SIGNAL AND EXTREMITY MARKER DEVICE THEREFOR
Filed Nov. 15, 1948           2 Sheets-Sheet 2
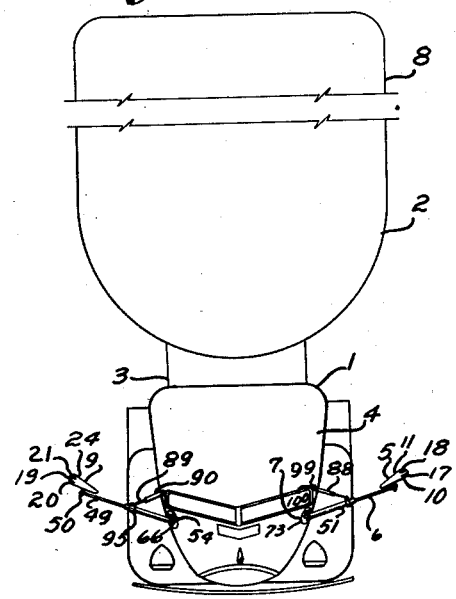
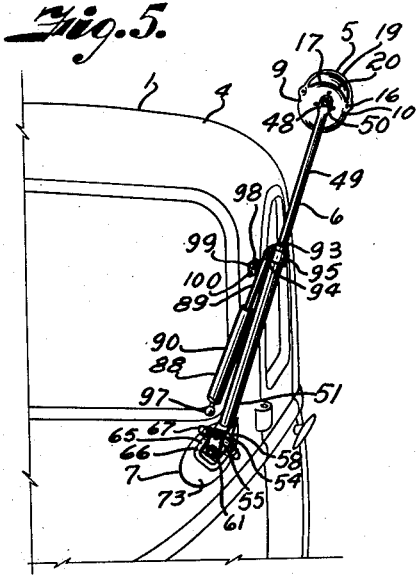
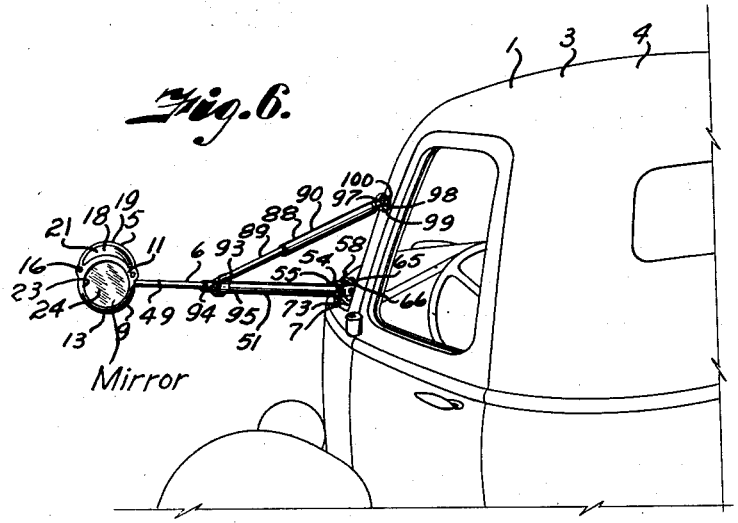
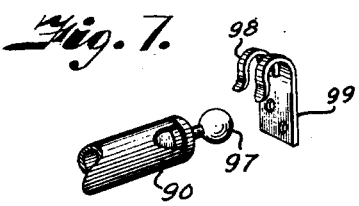
Inventor
Thomas L. Dalton
By
Fishburn & Mullendore,
Attorneys.

Patented June 20, 1950

2,511,971

UNITED STATES PATENT OFFICE 2,511,971

COMBINATION OF A VEHICLE AND REAR-VIEW MIRROR SIGNAL AND EXTREMITY MARKER DEVICE THEREFOR

Thomas L. Dalton, Kansas City, Mo.

Application November 15, 1948, Serial No. 60,004

5 Claims. (Cl. 177—329)

This invention relates to the combination of a vehicle and rear view mirror, signal and extremity marker device therefor and more particularly to combination light signal and rear view mirror devices, their mounting and relationship to a vehicle for indicating contemplated turns, the vehicle extremities to traffic and furnish the driver a rear view without any of the light from the signal interfering with the driver's view.

Trucks and tractor semitrailers are required to carry various types of lights, extremity markers and signals as a result of efforts of the various States to reduce the hazards of highway travel, however, there are still many accidents attributed to deficiencies of the markers on such vehicles. The cab of the usual tractor is narrow in width as compared with the width of the conventional semitrailer. Therefore the usual lights or signals on the tractor are not visible to the rear thereof and as another vehicle moves around the side of the trailer, the signals on the rear of said trailer are not visible. There have been arrangements where mirrors are mounted on long arms projecting from the sides of the cab whereby the mirrors are in position to provide a view to the rear and sides of the trailer. However in use, due to the long arm and vibration, it is difficult for the driver in the cab to clearly distinguish other vehicles approaching from the rear. While there are usually extremity markers on trailers, it is quite common for the loads on the vehicle to extend past the markers so they do not properly indicate the extremities.

The objects of the present invention are to provide a vehicle with a single unit on each side of the cab and extending therefrom for indicating contemplated turns, vehicle extremities and furnish the driver a rear view without interference due to glare from the signal lights; to provide a novel arrangement of mirror, clearance lamp and turn signal related to the sides of the vehicle whereby the light from the device may be seen both forwardly and rearwardly of the vehicle in a line parallel with the sides thereof and also from points spaced laterally from said vehicle without any light rays being directed toward the cab and driver; to provide a combination turn signal, extremity marker and rear view mirror on an arm substantially universally mounted on the vehicle and braced therefrom to eliminate vibrations interfering with the visibility afforded by the rear view mirror; to provide an adjustable brace quickly and easily disengaged to permit moving the signal device upwardly or otherwise out of the path of other objects, thereby permitting the cab to move in close to other objects as in moving into a dock; to provide a housing for the signal light, said housing having diverging front and rear walls, the rear wall carrying a rear view mirror, said housing having a cylindrical, peripheral wall on the outer portion carrying lenses at the front and rear thereof through which the light is visible; to provide a universal mounting for said signal housing whereby the signal portion of the housing may be turned upwardly to reduce the over-all distance between the extremities of the devices projecting from each side of the cab without reducing the rear view of the driver; to provide a turn signal, extremity marker and rear view mirror device for trucks and trailers whereby such devices on each side of the cab of the vehicle provide adequate signals to other traffic and a rear view to the driver of the vehicle, reducing the hazards of highway travel and eliminating excessive light on the vehicle for obtaining the same results; to provide an attractive streamlined signal and rear view mirror unit which is simple in construction and operation; and to provide improved elements and arrangements thereof in a combination signal unit and rear view mirror of the character and for the purpose noted.

In accomplishing these and other objects of the present invention, I have provided improved details of structure, the preferred forms of which are illustrated in the accompanying drawings, wherein:

Fig. 1 is a perspective view of a combination turn indicator, extremity marker, rear view mirror unit and supporting structure therefor embodying the features of the present invention, the same being mounted on the cab of a vehicle forwardly of the door thereof.

Fig. 2 is a substantially horizontal sectional view through the signal housing, portions of the mounting arm and brace being broken away to better illustrate the structure thereof.

Fig. 3 is a perspective view of the universal mounting of the signal arm on the support.

Fig. 4 is a plan view of a tractor-trailer and combination turn signal, extremity marker and rear view mirror devices extending outwardly from the cab to illustrate the relative position of the signal and the vehicle.

Fig. 5 is a perspective view of the combination signal unit and mounting arm swung upwardly relative to the cab to permit same to move in close to other objects.

Fig. 6 is a rear perspective of the combination mirror and signal housing, illustrating the signal lens turned upwardly to reduce the over-all width between said housing and the mounting arms for said housing.

Fig. 7 is a disassembled perspective view of the end of the brace arms and connector therefor adapted to be mounted on the post at the side of the windshield of the cab.

Referring more in detail to the drawings:

1 designates a motor vehicle such as a truck or tractor trailer and the like, the illustration in Fig. 4 showing a load-carrying trailer 2 drawn by a tractor 3, said tractor having a cab 4. The cab is provided with combination turn signal, extremity marker and rear view mirror devices 5 supported on each side of the cab in spaced relation thereto by telescopic arms 6 substantially universally mounted on the cab as at 7, said signal and rear view mirror devices being located in relation to the sides 8 of the trailer 2 so as to enable the driver in the cab to get a view through the mirror of a portion of the roadway directly behind the vehicle. More particularly the combination turn signal, extremity marker and rear view mirror consists of a housing 9 cast or stamped of metal and having diverging front and rear walls 10 and 11 said walls being substantially circular.

In the form illustrated in Fig. 2, the housing 9 consists of front and rear sections 12 and 13, the walls 10 and 11 of the respective sections having inwardly turned peripheral flanges 14 forming seating edges 15 arranged on a plane bisecting the angle of divergence of the walls 10 and 11, the front and rear sections being secured together by suitable fastening devices 16 such as screws or the like. The peripheral flanges 14 at the wider spaced portion of the walls 10 and 11 are arcuate in cross-section and are provided with openings 17 and 18 arranged in the front and rear sections respectively. The openings are spaced from the edges 15 whereby when viewed from the front or rear of the housing, the walls 10 and 11 are circular and the arcuate portion 19 of the flanges 14 is a peripheral band extending from the wider spaced portions of the walls 10 and 11 and describing an arc having substantially the same radius as the circular portions of the walls 10 and 11, the radius of the extending ring portion being spaced from the radial centers of the walls 10 and 11 toward the wider portion of the housing. With this arrangement the openings 17 and 18 are substantially crescent in shape. Closing the openings 17 and 18 and seating in the housing adjacent the edges of said openings are lenses 20 and 21 secured in place by means of suitable fastening devices 22. The lenses 20 and 21 are preferably of glass or plastic, the lens 20 in the forward section preferably being amber in color and the lens 21 in the rear section being red in color. The rear wall 11 is preferably provided with a circular aperture 23 which is closed by a glass or the like 24 suitably mounted on the housing, said glass 24 having a mirror backing 25 whereby the entire opening 23, which is only slightly smaller than the circle of the rear wall 11, provides a rear view mirror.

Suitably mounted in the housing is a socket 26 carrying a light bulb 27 having two filaments 28 and 29 of different resistances whereby the filament 28 is energized to provide more candle power of illumination than the filament 29. The light bulb 27 is arranged in the housing spaced from the openings 17 and 18 toward the center portion of the housing whereby the light rays from the bulb cannot enter the cab of the vehicle and blind the driver as later described. The filaments of the bulb are preferably substantially adjacent the radial center of the band portion 19 of the peripheral flanges of the housing.

The forward wall 10 is provided with an inwardly directed boss 30 arranged substantially at the center of the section 12. The inner surface 31 of said boss is provided with a seat 32 for receiving a socket member 33 adapted to cooperate with a socket member 34 for receiving a ball 35 on the end of a spindle 36 which extends through an aperture 37 in the wall 10. The members 33 and 34 are secured on the boss 30 and drawn together by means of screws 38 extending through apertures 39 in the wall 10, apertures 40 in the flanges on the seating member 33 and threaded into apertures 41 of flanges of the socket member 34. Turning of the screws 38 tightens the socket members on the ball 35 to provide suitable friction for resisting turning of the housing on the ball. The front wall 10 also has an aperture 43 through which extends a conduit 44 having conductors to connect the filament of the bulb 27 to a source of energy.

The spindle 36 is provided with an enlarged portion 45 spaced from the ball 35 and terminates in a threaded portion 46 which extends through apertures 47 in a flat portion 48 of a tubular arm extension 49, said spindle extension being rigidly secured to the flattened portion 48 by means of a nut 50. The arm extension 49 is telescopically received in a tubular arm 51 closely engaging and sliding over the tubular arm extension 49 to provide for relative movement therebetween to adjust the position of the housing 9 relative to the cab of the vehicle as later described. The tubular arm and tubular arm extension 49 are held in selected position by means of a setscrew 52 or the like extending through a threaded opening 53 in the arm 51 and adapted to engage the arm extension 49. The arm 51 is secured by welding or the like to a yoke 54 having spaced legs 55 provided with apertures 56 through which extend coaxial threaded studs 57, said studs being secured to a block 58 located between the legs 55 and having faces 59 spaced from the inner surfaces of the legs 55 whereby suitable resin plastic washers 60 are located between the faces 59 and the inner faces of the legs 55. Nuts 61 are threadedly mounted on the studs 57, and tightening of said nuts adjusts the friction between the legs 55, washers 60 and block 58, to control the resistance to movement thereof. The block 58 is provided with an aperture 62 extending therethrough perpendicular to the axis of the studs 57, a threaded shaft being applied to the aperture 62 and having threaded ends extending outwardly from the faces 63 of the block 58, the threaded ends extending through apertures 64 in legs 65 of a yoke 66, the threaded ends of the shaft being provided with nuts 67 which by threading onto the shaft tighten the legs against resin plastic washers 68 located between the inner faces of the legs 65 and the faces 63 of the block 58, whereby tightening of the nuts 67 adjusts the friction to resist pivotal movement of the blocks relative to the yoke 66. The arrangement of the studs 57 and shaft 63, together with the yoke and block 58, provides a substantially universal mounting of the arm 51.

Secured to the bar portion 69 of the yoke 66 is a hollow shank 70 having external threads 71 adapted to extend through an aperture 72 in a plate 73, and aperture 74 in the body 75 of the cab and an aperture 76 of a plate 77 adapted to engage the interior surface of the body member 75. A nut 78 is threaded onto the shank 70 to secure the yoke member 66 to the body member of the cab, the plate 73 preferably being curved whereby tightening of the nuts 78 draws the plate 73 toward the body 75 to provide some resiliency in the mounting thereof. The conduit 44 extends through an aperture 80 adjacent the outer end of the tubular arm extension 49, said conduit extending through the interior of the tubular arm extension and tubular arm 51 to a point adjacent the yoke 54, the arm 51 being provided with an aperture 81 adjacent said yoke whereby the conduit extends exteriorly of the arm and through an aperture 82 in the bar portion 69 of the yoke and through the tubular shank 70. The conduit contains two wires 83 and 84 connected with the filaments 28 and 29 respectively, the other ends being connected to a battery circuit 85 of the vehicle to provide electrical energy to the filaments under control of switches 86 and 87, the other terminals of the filaments being grounded to the housing and cab through the mounting connections therefor.

The arm 51 is held in an adjusted angular position relative to the cab by means of a brace 88, said brace consisting of a tubular metal member 89 telescopically received in a sleeve member 90 which closely engages and is slidable over the tubular member 89, the tubular member and sleeve being held in selected position by means of a setscrew 91 threaded in the wall of the sleeve member 90 and engaging the tubular member 89. The member 89 has a flat end 92 pivotally mounted as at 93 to ears 94 carried on a collar 95 which is sleeved over the tubular arm 51, the collar 95 being held in selected position on said arm by means of a setscrew 96 threadedly mounted in the collar and adapted to engage the tubular arm 51. The free end of the base member is provided with a ball 97 adapted to be received under and between fingers 98 carried on a bracket 99 secured to the cab on the post between the door and the windshield, as at 100. This provides a spring latch for the ball 97 to rigidly hold the brace member to the cab.

It is preferable that the yoke member 66 be mounted at the sides of the cowl of the cab preferably slightly in front of the posts between the doors and windshield whereby the arms 51 and extensions 49 extend outwardly from the sides of the cab, the universal mounting of the arms 51 providing for selective angular adjustment as desired. Also the arms extensions 49 may be adjusted relative to the arms 51 to position the housing 9 at the side of the vehicle as illustrated in Figs. 1 and 4 whereby the mirror provides a rear view for the driver of objects at the side and rear of the vehicle.

In order to reduce vibration and improve the visibility through the mirror, it is preferable that the ears 94 be turned substantially upwardly whereby moving the brace 88 in the position to fasten the ball 97 in the fingers 98 applies a twist or rearwardly bending movement to the arm 51 to form a rigid structure for holding the housing stationary. By releasing the brace from the bracket 99 the arm 51 may be swung upwardly or in other angular arrangement to the cab whereby the cab may maneuver adjacent other vehicles and docks or the like.

The operation of a device constructed as described is as follows:

Assuming a vehicle 1 to be provided with combination turn indicator, extremity marker and rear view mirror devices and mountings therefor as described on each side of the cab as shown in Fig. 4 of the drawings, preferably prior to starting the vehicle the operator adjusts the outward extension of the arms 49 and 51 whereby the housings 9 and mirrors thereon are positioned relative to the sides of the vehicle to provide the operator with a view of objects to the rear of the vehicle regardless of the loading thereon. With this arrangement, the openings 17 and 18 extend outwardly past the loading to indicate the vehicle and/or load extremities. In driving at night, the switch 87 is closed to energize the filament 29 to provide an extremity marker light visible to the front and rear of the vehicle, but due to the mounting of the housing and position of the openings 17 and 18, the light rays of the bulb are limited to an angle extending outwardly from a plane parallel to the vehicle whereby none of the light rays can enter the eyes of the driver of the vehicle to interfere with the vision of the road or the view provided by the rear view mirror. When the driver contemplates any turn he may close the switch 86 to energize the filament 28 in the housing on the side to which he contemplates turning to provide a turn signal visible to approaching traffic at the front and rear and side of the vehicle, the resistance of filament 28 being such that the light therefrom is considerably brighter than the light from the filament 29, providing contrast to the extremity marker light. Also it is preferable to provide a conventional blinker switch 101 whereby the turn signal light will be intermittently illuminated to increase the warning characteristic of the signal.

The present device provides all of the necessary indications except for conventional taillights, stop lights, and headlights on the tractor, thereby reducing the number of lights required to adequately provide safety for highway travel. In localities where the width limits of the vehicle are such that the lens portions of the housing 9 extend too far outwardly the housing may be turned as shown in Fig. 6, with the lenses 20 and 21 directed upwardly, thereby reducing the overall width a few inches and still provide for substantially the same result in regard to the signalling of turns and marking the extremities of the width of the vehicle or load thereon.

What I claim and desire to secure by Letters Patent is:

1. The combination of a vehicle and a combined rear view mirror and signal device including, a telescopic arm universally mounted on the vehicle adjacent the side of the windshield for extension outwardly from the side of said vehicle, a housing having a peripheral wall connecting diverging front and rear walls, means for universally mounting the housing adjacent the free end of the arm, said housing having openings at the front and rear of the wider portions thereof, a selectively energizable light bulb in said housing spaced from the openings toward the narrow part of the housing whereby the light from said bulb will be visible from the front, rear and side of the vehicle and invisible to the driver, and a mirror on the rear wall of said housing for providing the driver with a view to the rear of the vehicle and indicating the position of the housing relative to the side extremity of said vehicle.

2. The combination of a vehicle and a combined rear view mirror and signal device including a telescopic arm, means for mounting the arm on the vehicle forwardly of the door for substantially universal movement of the arm with respect to the vehicle, a housing having a peripheral wall conecting diverging front and rear walls, the peripheral wall at the wider portion being cylindrical in cross-section, means for universally mounting the housing adjacent the free end of the arm, said housing having openings at the front and rear of the cylindrical portion of the peripheral wall, a selectively energizable light bulb in said housing spaced from the openings toward the narrow part of the housing whereby the light from said bulb will be visible from the front, rear and side of the vehicle and invisible to the driver, and a mirror on the rear wall of said housing for providing the driver with a view to the rear of the vehicle and indicating the position of the housing relative to the side extremity of said vehicle.

3. The combination of a vehicle and a combined rear view mirror and signal device including, a telescopic arm, universally mounted on the vehicle adjacent the side of the windshield for extension outwardly from the side of said vehicle, a telescopic brace connected to said arm in spaced relation to the vehicle and having connection with the vehicle above the arm for retaining the arm in selected position, a housing having a peripheral wall connecting diverging front and rear walls, the peripheral wall at the wider portion being cylindrical in cross-section, means for universally mounting the housing adjacent the free end of the arm, said housing having openings at the front and rear of the cylindrical portion of the peripheral wall, a selectively energizable light bulb in said housing spaced from the openings toward the narrow part of the housing whereby the light from said bulb will be visible from the front, rear and side of the vehicle and invisible to the driver, and a mirror on the rear wall of said housing for providing the driver with a view to the rear of the vehicle and indicating the position of the housing relative to the side extremity of said vehicle.

4. A combined rear view mirror and signal device including, a telescopic arm adapted to be universally connected to a vehicle, a housing having a peripheral wall connecting diverging front and rear walls, means for universally mounting the housing adjacent the free end of the arm, said housing having openings at the front and rear of the wider portion thereof, a selectively energizable light bulb in the housing spaced from the openings toward the narrow portion of the housing whereby the light from said bulb will be visible in a limited angle relative to the housing, and a mirror on the rear wall of the housing for providing the driver with a view to the rear of the vehicle.

5. A combined rear view mirror and signal device including, a housing having a peripheral wall connecting diverging front and rear walls, said housing having openings at the front and rear of the wider portion thereof, a selectively energizable light bulb in the housing spaced from the opening toward the narrow portion of the housing whereby the light from said bulb will be visible through said openings, non-opaque means closing said openings so as to permit light rays from the light bulb to pass therethrough, said rear wall of the housing having an opening therein, and a closure member in the form of a mirror positioned in said housing so as to close the opening in the rear wall and enclose the light bulb in the housing.

THOMAS L. DALTON.

REFERENCES CITED

The following references are of record in the file of this patent:

UNITED STATES PATENTS

| Number | Name | Date |
|---|---|---|
| 1,223,981 | Johnson | Apr. 24, 1917 |
| 1,368,644 | Mochizuki | Feb. 15, 1921 |
| 1,449,070 | Spangler | Mar. 20, 1923 |
| 2,180,610 | Ritz-Woller | Nov. 21, 1939 |